United States Patent [19]

Peterson

[11] Patent Number: 4,815,765

[45] Date of Patent: Mar. 28, 1989

[54] ADJUSTABLE STEERING ASSEMBLY

[75] Inventor: Walter J. Peterson, Eden Prairie, Minn.

[73] Assignee: The Toro Company, Minneapolis, Minn.

[21] Appl. No.: 93,442

[22] Filed: Sep. 4, 1987

[51] Int. Cl.[4] .............................................. B62D 1/18
[52] U.S. Cl. ....................................... 280/775; 74/493; 180/334
[58] Field of Search ................ 280/775; 180/334, 315; 74/493

[56] References Cited

U.S. PATENT DOCUMENTS

| 3,302,478 | 2/1967 | Pauwels | 74/493 |
| 4,449,419 | 5/1984 | Bruguera | 74/493 |
| 4,537,089 | 8/1985 | Moneta | 74/493 |
| 4,656,888 | 4/1987 | Schmitz | 280/775 |
| 4,664,221 | 5/1987 | Loney et al. | 180/315 |

Primary Examiner—Richard A. Bertsch
Attorney, Agent, or Firm—James W. Miller

[57] ABSTRACT

An improved steering assembly 2 for a vehicle comprises a pivotal steering column 10 which supports a tiltable steering wheel 32. A locking rod 52 is secured to column 10 and a locking flange 60 to support assembly 32 for wheel 32. Rod 52 and flange 60 have slots received on a cross shaft 17 with interposed friction discs 70 also being received on shaft 17. A single rotatable control handle 24 compresses or releases the discs 70 from engagement with rod 52 and flange 60 to simultaneously lock or unlock column 10 and steering wheel 24 for a pivotal adjustment relative to vehicle seat 6.

4 Claims, 1 Drawing Sheet

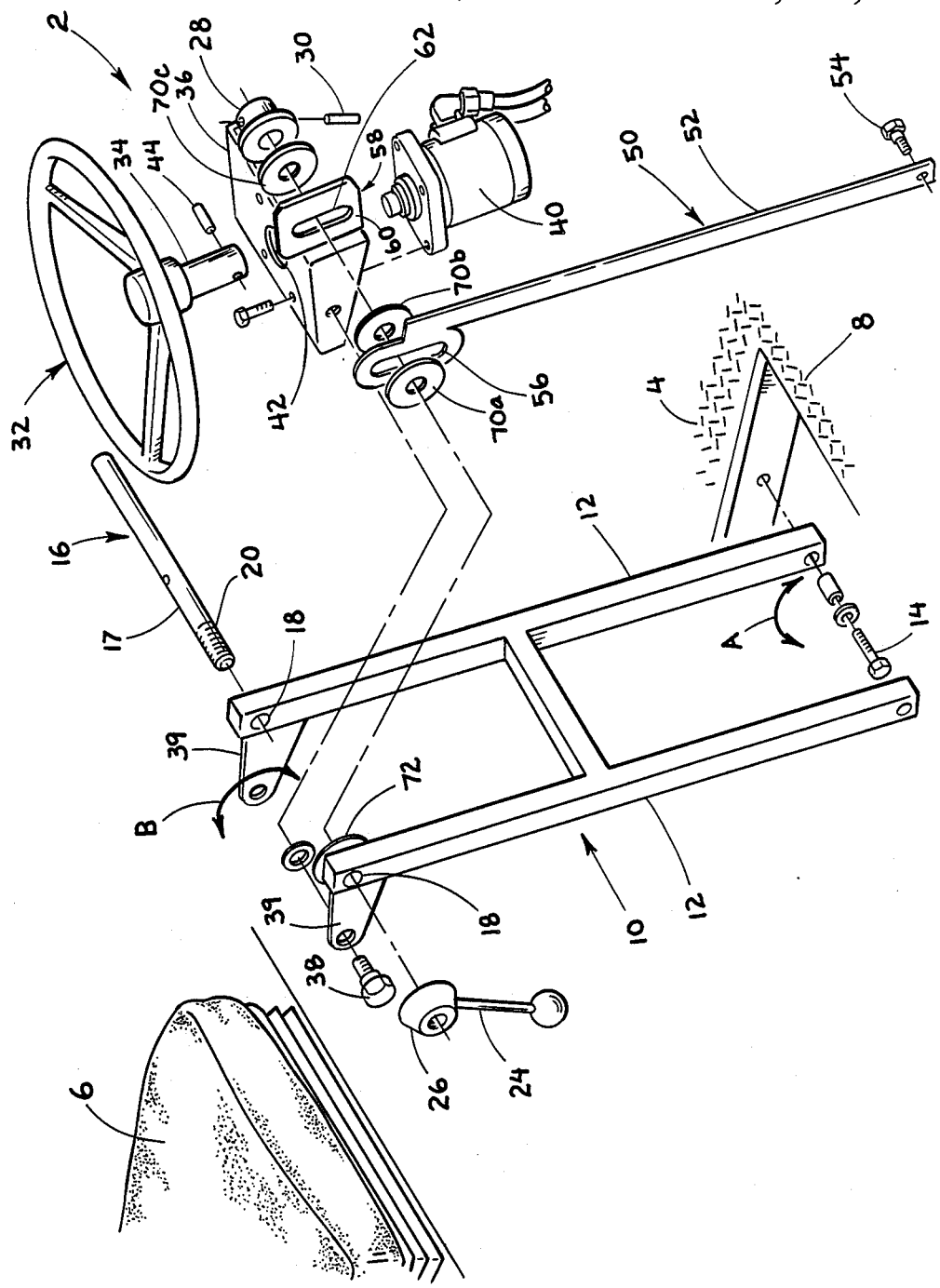

ADJUSTABLE STEERING ASSEMBLY

TECHNICAL FIELD

This invention relates to a movable, power driven vehicle having a steering assembly which an operator uses in guiding the vehicle during operation. More particularly, this invention relates to an improved steering assembly for such a vehicle which includes a pivotable steering column that supports a tiltable steering wheel.

BACKGROUND OF THE INVENTION

Various powered vehicles are known in the agricultural and turf care industries which are movable over the ground and perform various operations on the ground or on growing vegetation. For example, combines are known for harvesting crops and large mowing machines are known for cutting grass. The Toro Company, the assignee of the present invention, manufactures and sells various large mowing machines for cutting grass over wide areas sush as golf courses and the like. These include the Parkmaster series and the HTM series of mowers.

Machines of the type noted above usually have an operator's cab or area in which a seat and steering assembly are contained. The steering assembly usually includes an upright steering column that is located in front of the seat. In addition, the steering assembly also has a rotatable steering wheel carried at the top of the steering column. It has been known in such machines to pivotally mount the steering column on the machine so that it can be adjusted towards or away from the seat. It has also been known to pivotally mount the steering wheel on the steering column so that it's tilt or angle of inclination can be adjusted relative to the seat. Both adjustments are desirable to give the operator greater comfort, both in getting in and out of the seat and also while driving the vehicle, since he can tailor the positions of the steering column and steering wheel to suit his individual requirements.

While the adjustable steering columns and steering wheels known in the prior art function effectively in giving the operator the desired movement in these components, separate locking devices have been used in the prior art to individually lock these components in an adjusted position. For example, it is quite common on the steering column to have a foot operated pedal that moves a locking flange into and out of engagement with a pawl on the steering column to lock the steering column in place. The steering wheel often has an infinite friction type lock which is released or engaged by a small lever on the steering column.

The use of two separate locking assemblies, controlled by two separate control elements (i.e. the pedal and the lever), is disadvantageous as it unnecessarily complicates the design and involves multiple components which is costly. In addition, the operator has to manipulate two control elements with two separate motions if he wants to adjust both the steering wheel and steering column positions. Since these adjustments are often required whenever the operator mounts or dismounts the machine, the need for two separate motions wastes energy and over time becomes a nuisance for the operator.

SUMMARY OF THE INVENTION

One aspect of this invention is to provide an improved steering assembly for use on a powered vehicle which only requires a single control motion by the operator for locking or unlocking both the steering column and the steering wheel. Such a steering assembly would be suited for use on a vehicle having a movable frame which carries a seat for supporting an operator thereon. The improved steering assembly includes a steering column pivotally supported on the frame and a steering wheel rotatably supported on the steering column for rotation about a longitudinal axis thereof. In addition, the steering wheel is pivotally supported on the steering column for swinging about a substantially horizontal axis to vary its angle of inclination relative to the seat. Locking means are provided which hold the steering column and the steering wheel in pivotally adjusted positions. Control means are provided for engaging and releasing the locking means using only a single motion by the operator.

BRIEF DESCRIPTION OF THE DRAWINGS

The present invention will be described more fully in the following detailed description, when taken in conjunction with the following FIGURE, in which the identical numerals will refer to like elements throughout.

The FIGURE is an exploded perspective view of an improved steering assembly according to the present invention, particularly illustrating the locking means for holding the steering column and the steering wheel in pivotally adjusted positions.

DETAILED DESCRIPTION

Referring now to the FIGURE, an improved steering assembly according to the present invention is generally referred to as 2. Steering assembly 2 may be used on any steerable and motorized vehicle in which it is desired to control the direction of movement thereof. However, steering assembly 2 of the general type involved here is typically used on agricultural implements such as harvesters or on turf care equipment such as large mowing machines. Such vehicles typically have a wheel supported frame 4 that travels over the ground, which includes an operator's cab or area having a seat 6 on which the operator sits while driving the vehicle. Typically, there is also a floor or deck 8 adjacent seat 6 which may contain various traction and brake pedals. Steering assembly 2 is located on frame 4 of such a vehicle generally adjacent to and in front of seat 6.

Steering assembly 2 comprises an H-shaped pivotal steering column 10 having two vertically extending side frame members 12. A suitable pivot pin 14 pivotally secures the lower end of each member 12 to a portion of frame 4 slightly beneath deck 8 so that steering column 10 can be pivoted towards and away from seat 6 in the direction of arrows A to vary the spacing therebetween. Column 10 would normally be included inside some type of surrounding shroud (not shown).

Column 10 also includes a substantially horizontal cross member 16 received through aligned openings 18 in the upper ends of side frame members 12. Cross member 16 comprises a circular shaft 17 having a threaded end 20. Shaft 17 is sufficiently long to extend between side frame members 12 with the threaded end 20 thereof extending out through one of the members 12 to receive a control member in the form of a threaded handle 24 thereon. Shaft 17 is mounted on frame members 12 to have a small degree of transverse movement relative thereto to allow the shaft to be drawn through handle 24 as the handle is rotated. For example, the end of shaft 17 opposite to end 20 could be provided with a retaining pin (not shown) that is received inside a hollow upper end of side frame member 12 or adjacent the outside of side frame member 12 with a sufficient degree of play to allow shaft 17 a small amount of transverse movement through openings 18. Handle 24 includes a boss 26 which bears against the side frame member 12 when shaft 17 is drawn through handle 24 for a purpose to be set forth hereafter. In addition, an abutment member comprising a circular collar 28 is fixed to shaft 17 by a retaining pin 30 intermediate the ends of shaft 17, i.e. between side frame members 12 when shaft 17 is received therebetween.

A steering wheel 32 is provided having an axis of rotation defined by a steering wheel shaft 34. A saddle shape support assembly 36 is pivotally journalled by pivot pins 38 between two aligned ears 39 on the upper ends of side frame members 12 of steering column 10. Only one pivot pin 38 is shown in the FIGURE. A hydraulic servo motor 40 is bolted to the underneath side of support assembly 36. Steering wheel shaft 34 is rotatably journalled in an opening 42 in support assembly 36 and passes downwardly therethrough to be secured to the shaft of servo motor 40 by a pin or key 44. Rotation of steering wheel 32 relative to support assembly 36 will control the direction of the steerable wheels on the vehicle in any known manner, e.g. servo motor 40 controls hydraulic steering gear on frame 4. However, pivoting of support assembly 36 relative to steering column 10 about the axis of pivot pins 38 will vary the angle which the steering wheel shaft 34 forms relative to seat 6, this adjustment being shown by arrows B.

Suitable means are provided for locking both steering column 10 and steering wheel 32 in pivotally adjusted positions. The column locking means comprises a first locking member 50 in the form of an upwardly extending rod 52. Rod 52 is pivotally secured to the frame of the vehicle by a pivot pin 54. The upper end of rod 52 includes a slot 56 through which shaft 17 is received. Similarly, a second locking member 58 is provided for steering wheel 32. Locking member 58 comprises a flange 60 fixed to support assembly 36, as by welding, and having a slot 62 through which shaft 17 is received.

Rod 52 and flange 60 are received around shaft 17 in relatively close side-by-side proximity. A plurality of friction discs 70 are used on shaft 17 as follows: a first friction disc 70a is received between rod 52 and a circular washer 72 or bearing surface fixed to one of the side frame members 12, a second friction disc 70b is received between rod 52 and flange 60, and a third friction disc 70c is received between flange 60 and collar 28. This assembly of components is stacked up together side-by-side on shaft 17 so as to be simultaneously compressed or released by operation of handle 24.

In the operation of steering assembly 2 according to this invention, the operator needs only a single control member, namely handle 24, and a single control motion, namely a rotation of handle 24, to simultaneously lock or unlock both steering column 10 and steering wheel 32 for adjustment. Assume that the operator has mounted the vehicle and placed himself on seat 6 in preparation for operating the vehicle. It would be normal for him to find control column 10 pivoted as far away as possible from the seat since it would probably have been placed in that position by the last operator when he dismounted, and handle 24 would have been tightened against side frame member 12. All the operator has to do to adjust the column and the wheel is to rotate handle 24 in a direction which pushes collar 28 on shaft 17 away from handle 24, thereby loosening up the stacked array comprising brake discs 70, rod 52 and flange 60. When sufficient loosening has occured, the operator can then grab the steering wheel 32 and pivotally adjust the column 10 by pulling the column towards him on the seat until it reaches a position which suits him. Then, or perhaps simultaneously with the pulling motion, the operator can also tilt steering wheel 32 relative to column 10 to adjust the angle steering shaft 34 forms relative to the seat, again to a position which suits him. In this regard, the operator would have loosened the locking means only to the point at which adjusting movements are allowed, but would have kept some residual friction between the brake discs 70, rod 52 and flange 60. This residual friction would hold the components in their adjusted positions until the operator could positively relock the assembly. To relock the components in their adjusted positions, the operator then only has to rotate the handle in the reverse direction to begin drawing collar 28 back toward the handle. This movement of the collar will compress the assembled discs 70, rod 52 and flange 60 between the collar and the washer to relock the steering column and steering wheel in their pivotally adjusted positions.

Steering assembly 2 as described herein is advantageous in its simplicity of structure and operation. The elements comprising the locking means are kept to a minimum and are operated by a single control handle 24 using a single motion. The operator does not have to unlock a first control member for the steering column, and then, after adjustment of the steering column, unlock a second separate control member for adjustment of the steering wheel. Manipulation of the single control handle 24 simultaneously unlocks both elements for adjustment. Since the steering column and steering wheel are often adjusted every time the operator gets in or out of seat 6, this invention will yield less wasted motion and thus greater customer satisfaction.

Various modifications will be apparent to those skilled in the art. For example, the hydraulic servo motor 40 could be replaced by an appropriate mechanical linkage, i.e. one using ball joints or the like to accomodate the tilting in the column or wheel, if desired. Thus, the scope of this invention is to be limited only by the appended claims.

I claim:

1. An improved vehicle of the type having a frame; means for supporting the frame for movement over the ground; a seat carried on the frame for supporting an operator thereon; and a steering assembly located on the frame for use by the operator in guiding the vehicle, wherein the steering assembly includes a steering wheel; and wherein the improvement relates to the steering assembly and comprises:

(a) an upwardly extending steering column pivotally supported on the frame for movement towards and away from the seat to vary the distance therebetween, wherein the steering column has a lower end pivotally connected to the frame beneath the level of the seat and an upper end located above the level of the seat, and wherein the steering column includes a substantially horizontal cross member at its upper end;

(b) means for locking the steering column from pivoting relative to the frame, wherein the column locking means comprises a first locking member pivotally secured to the frame and having a locking slot which receives the cross member;

(c) a steering wheel rotatably supported on the steering column for rotation about a longitudinal axis of the wheel to control the direction of movement of the vehicle frame, wherein the steering wheel includes a steering wheel shaft which is rotatably journaled on a steering wheel support assembly, wherein the steering wheel support assembly is also pivotally supported on the upper end of the steering column for swinging about an axis which is substantially horizontal to thereby vary the angle of inclination of the longitudinal axis of the wheel relative to the seat;

(d) means for locking the steering wheel from pivoting relative to the steering column, wherein the wheel locking means comprises a second locking member fixed to the steering wheel support assembly and having a locking slot which receives the cross member; and (e) a single selectively operable control member for simultaneously locking and releasing both the column locking means and the wheel locking means.

2. An improved vehicle as recited in claim 1, wherein a plurality of brake discs are received on the cross member with at least one brake disc being adjacent each of the first and second locking members, and wherein the control member is operatively connected thereto to simultaneously compress each locking member against its adjacent brake disc.

3. An improved vehicle as recited in claim 2, wherein the first and second locking members and brake discs are stacked on the cross member closely adjacent to one another, wherein the cross member includes a fixed abutment thereon to one side of the stacked locking members and brake discs, and wherein the control member is located on the other side of the stacked locking members and brake discs and is axially movable on the cross member towards or away from the fixed abutment to lock or release the locking members respectively.

4. An improved vehicle as recited in claim 3, wherein the control member is threadedly engaged onto a threaded portion of the cross member.

* * * * *